United States Patent
Gilliland et al.

(10) Patent No.: US 11,186,381 B2
(45) Date of Patent: Nov. 30, 2021

(54) INTEGRAL MULTISTAGE RING GEAR SYSTEMS FOR AIRCRAFT

(71) Applicant: Textron Innovations Inc., Providence, RI (US)

(72) Inventors: Colton James Gilliland, Northlake, TX (US); Russell Lee Mueller, Coppell, TX (US); Tyson T. Henry, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 237 days.

(21) Appl. No.: 16/599,687

(22) Filed: Oct. 11, 2019

(65) Prior Publication Data

US 2021/0107671 A1 Apr. 15, 2021

(51) Int. Cl.
| | | |
|---|---|---|
| *F16H 3/64* | (2006.01) | |
| *B64D 35/04* | (2006.01) | |
| *F16H 57/02* | (2012.01) | |
| *B64C 27/28* | (2006.01) | |
| *B64C 29/00* | (2006.01) | |

(52) U.S. Cl.
CPC ............. *B64D 35/04* (2013.01); *B64C 27/28* (2013.01); *B64C 29/0033* (2013.01); *F16H 3/64* (2013.01); *F16H 57/02* (2013.01); *F16H 2057/02043* (2013.01); *F16H 2200/20* (2013.01)

(58) Field of Classification Search
CPC ..... B64D 35/04; B64C 27/28; B64C 29/0033; F16H 3/64; F16H 57/02
See application file for complete search history.

(56) References Cited

U.S. PATENT DOCUMENTS

| | | | | |
|---|---|---|---|---|
| 2,492,831 | A * | 12/1949 | Banker | B64C 27/12 475/159 |
| 3,188,884 | A * | 6/1965 | Bancroft | B64C 27/32 74/665 K |
| 6,260,793 | B1 * | 7/2001 | Balayn | B64C 39/029 244/7 R |
| 6,537,169 | B1 | 3/2003 | Morii | |
| 9,964,184 | B2 | 5/2018 | Modrzejewski et al. | |
| 10,221,939 | B2 | 3/2019 | Poster | |
| 10,385,959 | B2 | 8/2019 | Speller et al. | |
| 2010/0248884 | A1 | 9/2010 | Tremblay | |
| 2015/0274287 | A1 * | 10/2015 | Robertson | F16H 3/724 475/269 |
| 2015/0276020 | A1 | 10/2015 | Yoon et al. | |

* cited by examiner

*Primary Examiner* — Derek D Knight
(74) *Attorney, Agent, or Firm* — Lawrence Youst PLLC

(57) ABSTRACT

A drivetrain for an aircraft includes an engine, a driveshaft to receive rotational energy from the engine and a gearbox including a multistage planetary gear system to receive rotational energy from the driveshaft. The multistage planetary gear system includes an integral multistage ring gear system having flanged and cantilevered ends. The integral multistage ring gear system forms a first stage ring gear at the cantilevered end and a second stage ring gear interposed between the flanged end and the first stage ring gear. The multistage planetary gear system includes a first stage sun gear, first stage planet gears and a first stage carrier. The first stage planet gears mate with the first stage ring gear. The multistage planetary gear system includes a second stage sun gear, second stage planet gears and a second stage carrier. The second stage planet gears mate with the second stage ring gear.

20 Claims, 10 Drawing Sheets

INTEGRAL MULTISTAGE RING GEAR SYSTEMS FOR AIRCRAFT

TECHNICAL FIELD OF THE DISCLOSURE

The present disclosure relates, in general, to planetary gear systems for use on aircraft and, in particular, to multistage planetary gear systems that utilize an integral multistage ring gear system having a flanged end and a cantilevered end that provide flexured support to the ring gears formed thereon.

BACKGROUND

Planetary gear systems, also referred to as planetary or epicyclic gear trains, are used in many industries to provide a wide range of transmission ratios in a compact and lightweight layout. A typical arrangement of a planetary gear system includes the following elements: (1) an externally toothed sun gear, or sun wheel, coaxial with the gear train, (2) an internally toothed ring gear, or annulus, coaxial with the gear train, (3) two or more externally toothed planet gears, or pinions, that mesh with the sun gear and the ring gear and (4) a carrier coaxial with the gear train to support the planet gears. Any element of a planetary gear system may act as either an input or output of the system. In one example arrangement, the sun gear may be the input and the carrier may be the output while the ring gear remains fixed. Higher transmission ratios are attainable using a multistage, or stacked, planetary gear system in which the output of one stage of the multistage planetary gear system provides torque to the input of another stage of the multistage planetary gear system. Multistage planetary gear systems may include two or more stages depending on the transmission ratio requirements in a particular application. The final transmission ratio may be a multiple of the individual ratios of the stages.

Multistage planetary gear systems use two or more ring gears, one for each stage of the multistage planetary gear system. Current ring gears for multistage planetary gear systems are structurally separate parts that are bolted to a housing. For example, in a common implementation, each ring gear is sandwiched and bolted between two flanges of a gearbox housing. The need for multiple flanges, however, increases the weight and space penalty of such implementations, and the presence of bolted joints at each ring gear increases the risk of joint failure due to radial loads imparted by the planet gears. The weight and space penalty of current multistage planetary gear systems is further increased by the inclusion of a flange at both ends of the housing to support the ring gears. Such ring gear arrangements have proven less than adequate for aerospace applications, which are particularly sensitive to weight and space constraints. Accordingly, a need has arisen for multistage ring gear systems that are lighter, use less space and are less prone to joint failure, thereby increasing their suitability for aerospace applications.

SUMMARY

In a first aspect, the present disclosure is directed to a drivetrain for an aircraft having an engine, a driveshaft configured to receive rotational energy from the engine and a gearbox including a multistage planetary gear system configured to receive rotational energy from the driveshaft. The multistage planetary gear system includes an integral multistage ring gear system having a flanged end and a cantilevered end. The integral multistage ring gear system forms a first stage ring gear at the cantilevered end and a second stage ring gear interposed between the flanged end and the first stage ring gear. The multistage planetary gear system also includes a first stage sun gear, first stage planet gears rotatable about the first stage sun gear and a first stage carrier coupled to the first stage planet gears. The first stage planet gears mate with the first stage ring gear. The multistage planetary gear system further includes a second stage sun gear, second stage planet gears rotatable about the second stage sun gear and a second stage carrier coupled to the second stage planet gears. The second stage planet gears mate with the second stage ring gear.

In some embodiments, the integral multistage ring gear system may be monolithically formed from a substantially homogenous material. In certain embodiments, the integral multistage ring gear system may jointlessly connect the first stage ring gear to the second stage ring gear. In some embodiments, the integral multistage ring gear system may include a spacer ring surrounding the first stage ring gear at the cantilevered end of the integral multistage ring gear system. In certain embodiments, a flange may project radially outwardly from the flanged end of the integral multistage ring gear system. In some embodiments, a flange at the flanged end of the integral multistage ring gear system may be the sole flange of the integral multistage ring gear system.

In certain embodiments, the integral multistage ring gear system may form a flex wall including a first stage flex wall and a second stage flex wall. In such embodiments, the first stage flex wall may have a different flexibility than the second stage flex wall. In some embodiments, the first and second stage flex walls may be divided by a tuning stiffener having an axial position along the integral multistage ring gear system, the axial position of the tuning stiffener determining the respective flexibilities of the first and second stage flex walls. In certain embodiments, the tuning stiffener may form a ring. In some embodiments, the tuning stiffener may project radially inwardly and/or radially outwardly from the flex wall. In certain embodiments, the tuning stiffener may be configured to decouple the flexibility of the first stage flex wall from the second stage flex wall.

In some embodiments, the first and second stage ring gears may be flexured ring gears to accommodate radial loads from the first and second stage planet gears. In certain embodiments, the first stage sun gear may be coupled to the driveshaft, the second stage sun gear may be coupled to the first stage carrier and the second stage carrier may be coupled to an output shaft. In some embodiments, the first stage ring gear may be a high speed ring gear and the second stage ring gear may be a low speed ring gear. In such embodiments, the high speed ring gear may have a smaller inner diameter than the low speed ring gear. In certain embodiments, the first stage ring gear may experience cantilevered motion to absorb radial loads from the first stage planet gears. In some embodiments, the drivetrain may include a proprotor assembly including proprotor blades and a mast, the second stage carrier coupled to the mast.

In a second aspect, the present disclosure is directed to a tiltrotor aircraft including a fuselage, a wing supported by the fuselage and first and second pylon assemblies rotatably coupled to outboard ends of the wing. Each pylon assembly includes an internal driveshaft, a proprotor assembly including proprotor blades and a mast and a gearbox including a multistage planetary gear system configured to receive rotational energy from the internal driveshaft. The multistage planetary gear system includes an integral multistage ring gear system having a flanged end and a cantilevered end.

The integral multistage ring gear system forms a first stage ring gear at the cantilevered end and a second stage ring gear interposed between the flanged end and the first stage ring gear. The multistage planetary gear system also includes a first stage sun gear, first stage planet gears rotatable about the first stage sun gear and a first stage carrier coupled to the first stage planet gears. The first stage planet gears mate with the first stage ring gear. The multistage planetary gear system further includes a second stage sun gear, second stage planet gears rotatable about the second stage sun gear and a second stage carrier coupled to the second stage planet gears. The second stage planet gears mate with the second stage ring gear. The second stage carrier is coupled to the mast.

In some embodiments, the fuselage may include an engine and the wing may include an interconnected driveshaft configured to transfer rotational energy from the engine to the pylon assemblies. In such embodiments, the internal driveshafts may transfer rotational energy from the interconnected driveshaft to the multistage planetary gear systems. In certain embodiments, the pylon assemblies may each include a spiral bevel gearbox interposed between the interconnected driveshaft and the multistage planetary gear system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
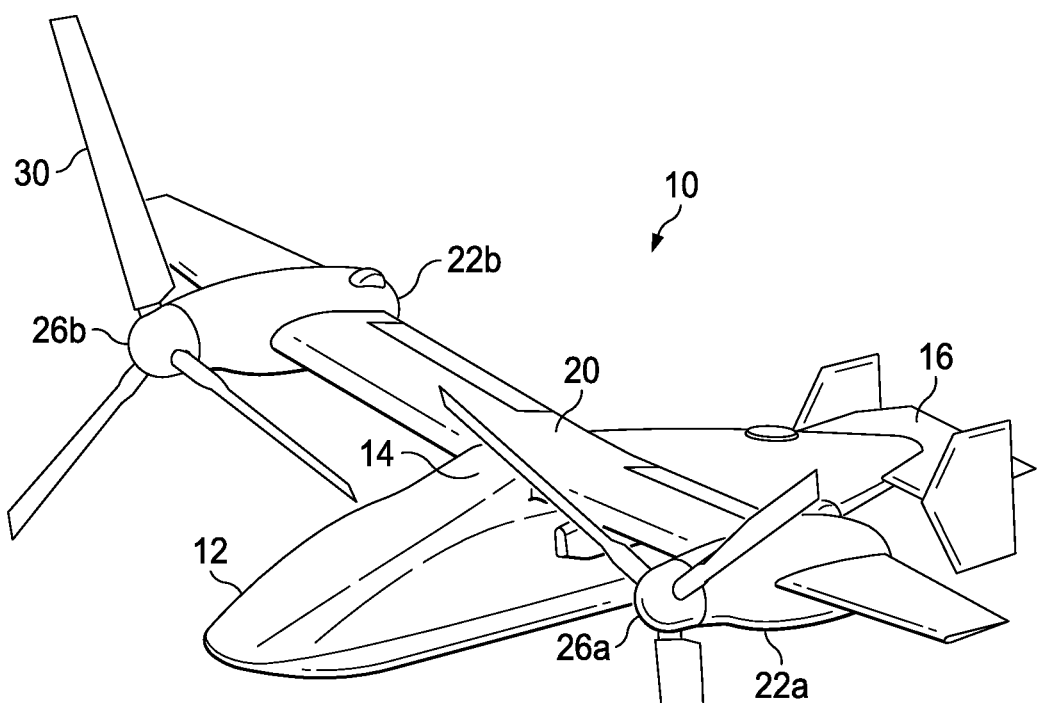
FIGS. 1A-1C are schematic illustrations of a tiltrotor aircraft utilizing integral multistage ring gear systems in accordance with embodiments of the present disclosure.
Figure 1B:
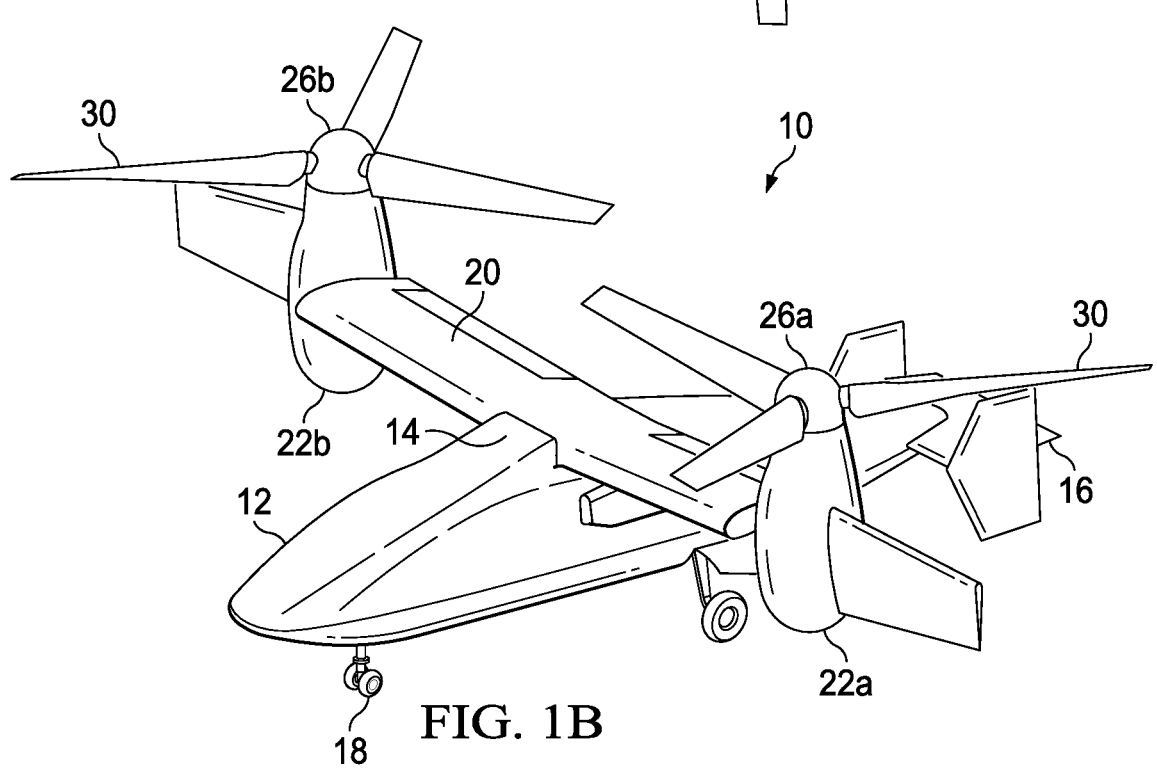
Figure 1C:
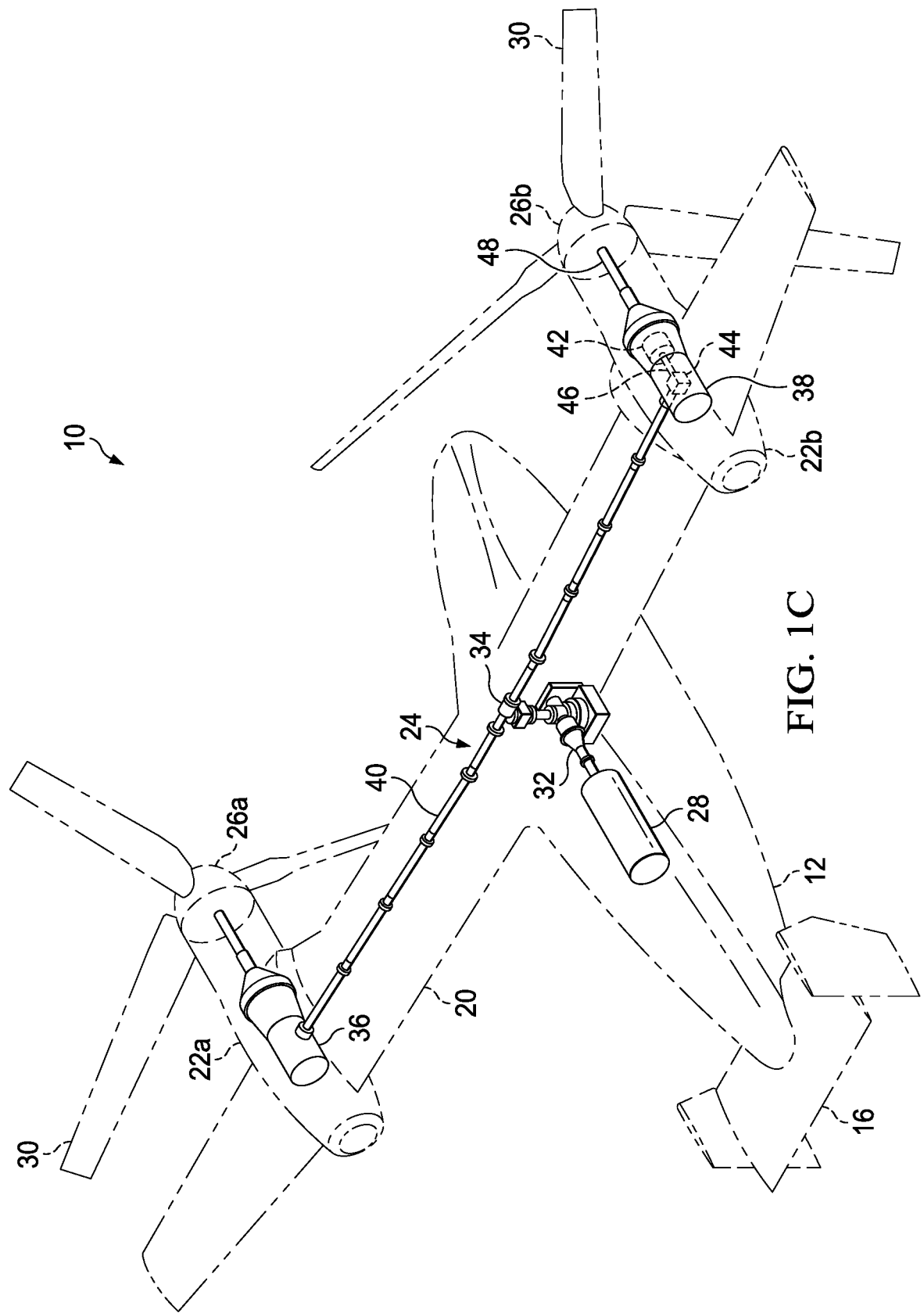

Referring to FIGS. 1A-1C in the drawings, a tiltrotor aircraft is schematically illustrated and generally designated 10. Tiltrotor aircraft 10 includes a fuselage 12, a wing mount assembly 14 and a tail assembly 16. Tail assembly 16 may have control surfaces operable for horizontal and/or vertical stabilization during flight. A landing gear system 18 provides ground support for tiltrotor aircraft 10. A wing 20 is supported by fuselage 12 and wing mount assembly 14.

Coupled to the outboard ends of wing 20 are pylon assemblies 22a, 22b. Pylon assembly 22a is rotatable relative to wing 20 between a generally horizontal orientation, as best seen in FIGS. 1A and 1C, and a generally vertical orientation, as best seen in FIG. 1B. Pylon assembly 22a includes a rotatable portion of a drivetrain 24 and a proprotor assembly 26a that is rotatable responsive to torque and rotational energy provided by an engine or motor 28 of drivetrain 24. Likewise, pylon assembly 22b is rotatable relative to wing 20 between a generally horizontal orientation, as best seen in FIGS. 1A and 1C, and a generally vertical orientation, as best seen in FIG. 1B. Pylon assembly 22b includes a rotatable portion of drivetrain 24 and a proprotor assembly 26b that is rotatable responsive to torque and rotational energy provided by engine 28 of drivetrain 24. In the illustrated embodiment, proprotor assemblies 26a, 26b each include three proprotor blade assemblies 30. It should be understood by those having ordinary skill in the art, however, that proprotor assemblies 26a, 26b could alternatively have a different number of proprotor blade assemblies, either less than or greater than three. In addition, it should be understood that the position of pylon assemblies 22a, 22b, the angular velocity or revolutions per minute (RPM) of proprotor assemblies 26a, 26b, the pitch of proprotor blade assemblies 30 and the like may be controlled by the pilot of tiltrotor aircraft 10 and/or a flight control system to selectively control the direction, thrust and lift of tiltrotor aircraft 10 during flight.

FIGS. 1A and 1C illustrate tiltrotor aircraft 10 in a forward flight mode or airplane flight mode, in which proprotor assemblies 26a, 26b are positioned to rotate in a substantially vertical plane and provide a forward thrust while a lifting force is supplied by wing 20 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 26a, 26b are positioned to rotate in a substantially horizontal plane and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 26a, 26b positioned between airplane flight mode and helicopter flight mode, which can be referred to as conversion flight mode.

Tiltrotor aircraft 10 uses drivetrain 24 including engine 28 and a transmission subsystem including gearboxes 32, 34 and pylon transmissions 36, 38 for providing torque and rotational energy to each proprotor assembly 26a, 26b via interconnected driveshaft 40 located in wing 20. Gearboxes 32, 34 are located in fuselage 12 and pylon transmissions 36, 38 are located in pylon assemblies 22a, 22b. Gearboxes 32, 34 and pylon transmissions 36, 38 may employ any type or combination of gears or gearboxes such as a spiral bevel gearbox, helical gearbox, coaxial helical inline gearbox, bevel helical gearbox, skew bevel helical gearbox, worm reduction gearbox, planetary gearbox, spur gearbox or any other assembly utilizing gears. For example, gearboxes 32, 34 may be, and pylon transmissions 36, 38 may include, spiral bevel gearboxes. In other embodiments, each pylon assembly 22a, 22b houses a drive system, such as an engine, motor and/or transmission subsystem, for supplying torque and rotational energy to a respective proprotor assembly 26a, 26b. In such embodiments, the drive systems of each pylon assembly 22a, 22b may be coupled together via one or more driveshafts located in wing 20 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Pylon transmission 38 is substantially similar to pylon transmission 36 therefore, for sake of efficiency, certain features will be disclosed only with regard to pylon transmission 38. One having ordinary skill in the art, however, will fully appreciate an understanding of pylon transmission 36 based upon the disclosure herein of pylon transmission 38. Pylon transmission 38 includes gearbox 42 and a nonparallel gearbox 44 interposed between interconnected driveshaft 40 and gearbox 42. Nonparallel gearbox 44 transfers torque between nonparallel and/or orthogonal driveshafts, namely interconnected driveshaft 40 and internal driveshaft 46. Internal driveshaft 46 is internal to pylon transmission 38 and transfers rotational energy from nonparallel gearbox 44 to gearbox 42. In one non-limiting example, nonparallel gearbox 44 is a spiral bevel gearbox.

Gearbox 42 includes a multistage planetary gear system configured to receive rotational energy from internal driveshaft 46 as an input and transmit rotational energy to mast 48 of proprotor assembly 26b as an output. The multistage planetary gear system provides a predetermined transmission ratio between internal driveshaft 46 and mast 48. The multistage planetary gear system has two or more stages each including a sun gear, a ring gear, two or more planet gears meshed with the sun gear and the ring gear and a carrier to support the planet gears. In previous aircraft, each ring gear in multistage planetary gear systems has been supported by the gearbox housing with flange and bolt arrangements that added significant weight, volume and the potential for joint failure to the multistage planetary gear system. The illustrative embodiments address these and other issues by including an integral multistage ring gear system with two or more ring gears integrally formed therewith. The integral multistage ring gear system also reduces the number of flanges and joints used to support the ring gears to reduce the weight, volume and joint wear issues of the multistage planetary gear system.

It should be appreciated that tiltrotor aircraft 10 is merely illustrative of a variety of aircraft that can implement the embodiments disclosed herein. Indeed, integral multistage ring gear systems may be implemented on any aircraft. Other aircraft implementations can include hybrid aircraft, tiltwing aircraft, quad tiltrotor aircraft, unmanned aircraft, gyrocopters, propeller-driven airplanes, compound helicopters, quadcopters, drones, jets, helicopters and the like. As such, those skilled in the art will recognize that integral multistage ring gear systems can be integrated into a variety of aircraft configurations. It should be appreciated that even though aircraft are particularly well-suited to implement the embodiments of the present disclosure, non-aircraft vehicles and devices can also implement the embodiments.

Figure 2A:
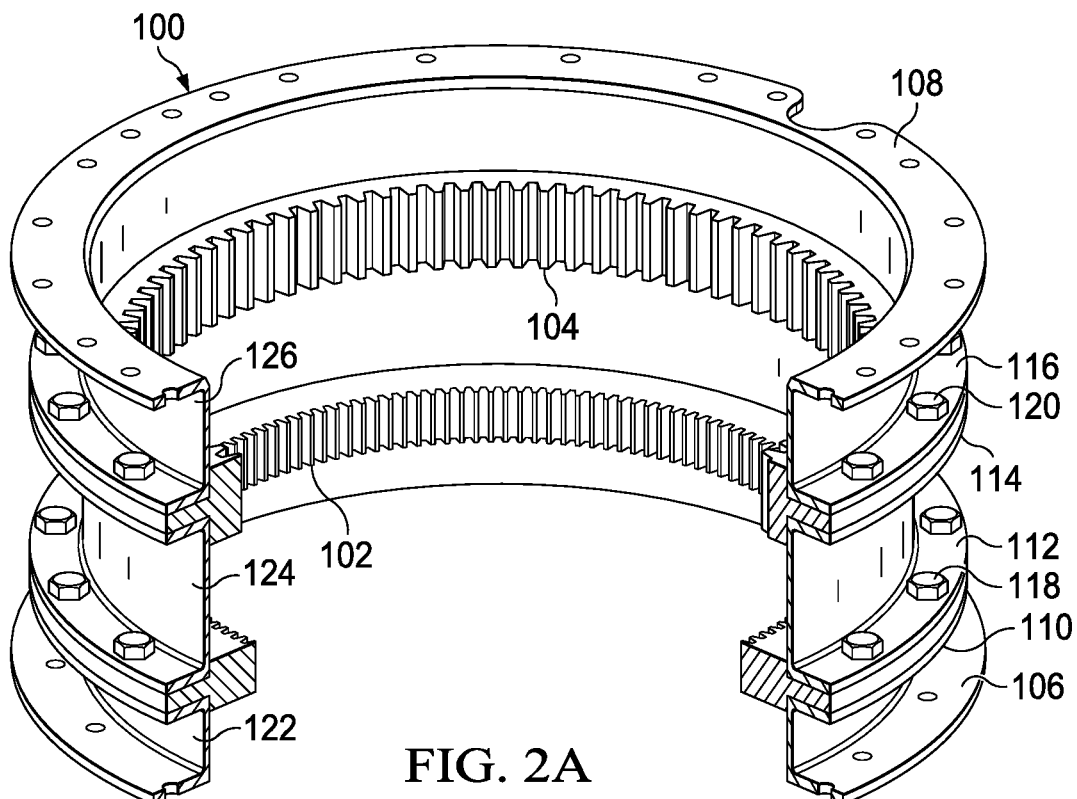
FIGS. 2A-2C are isometric views of various housings and ring gears used on previous aircraft.
Figure 2B:
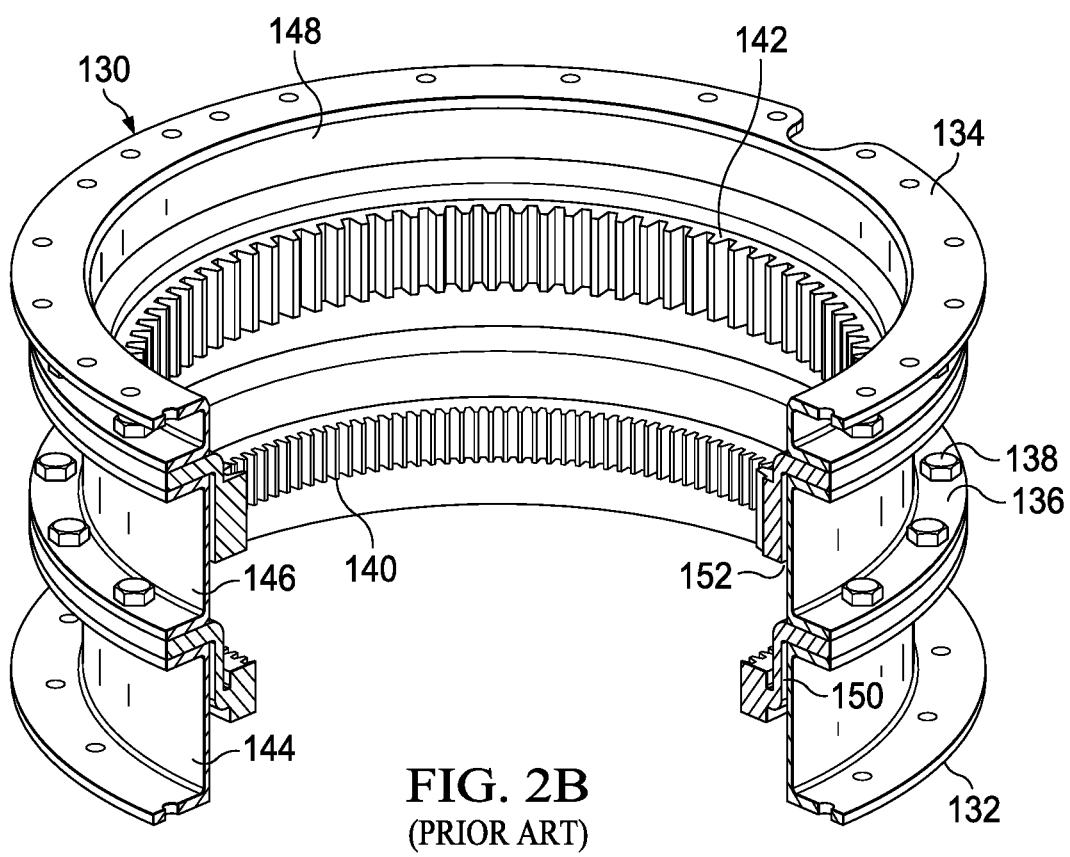
Figure 2C:
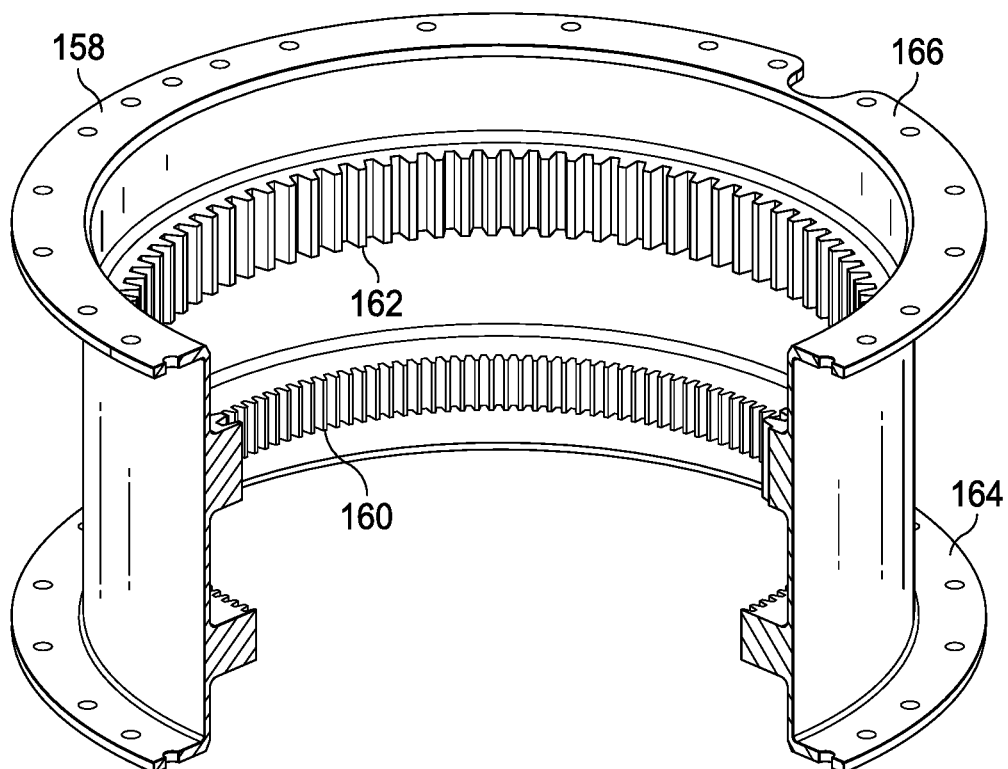
Figure 3A:
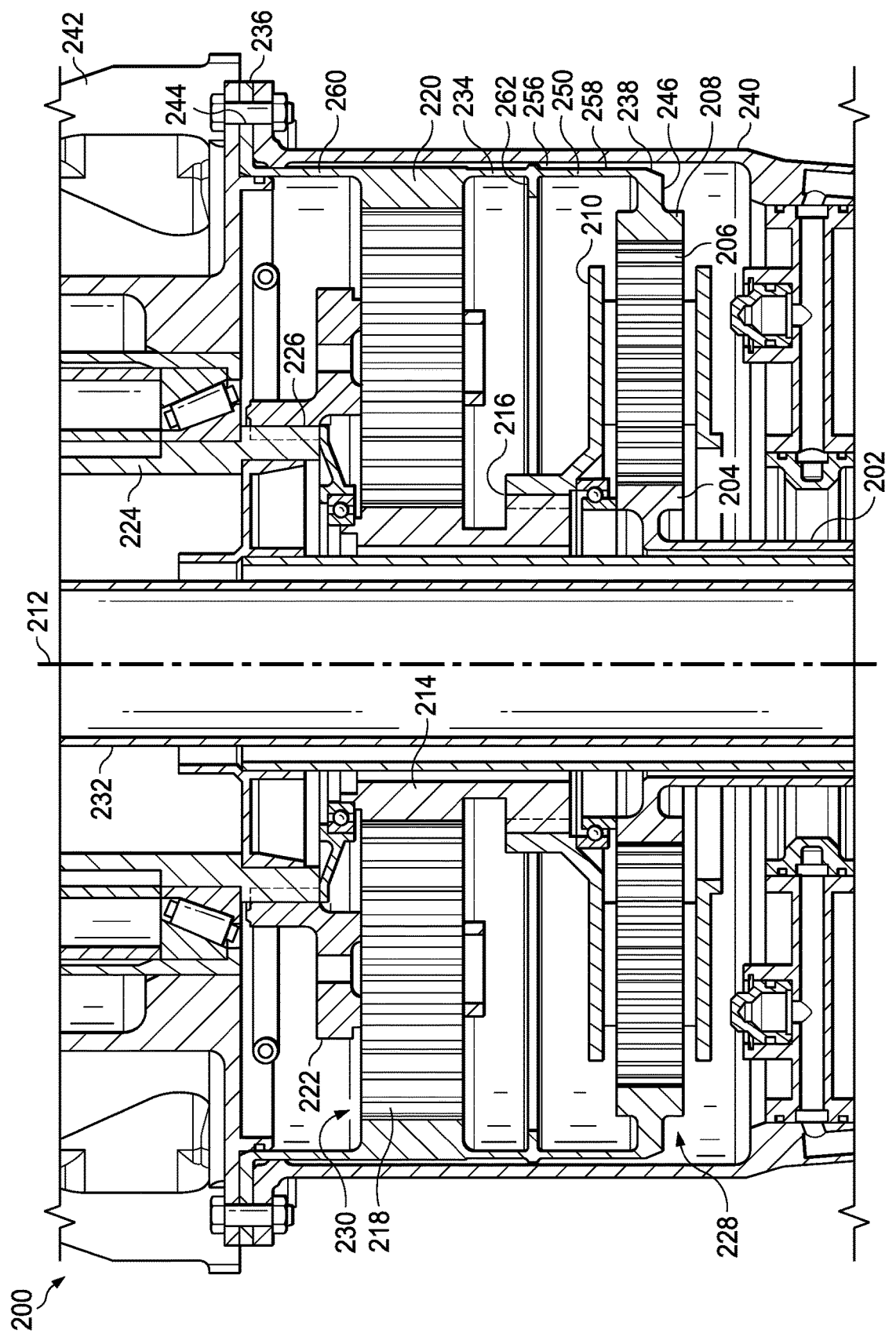
FIGS. 3A-3D are various views of a multistage planetary gear system including an integral multistage ring gear system in accordance with embodiments of the present disclosure.
Figure 3B:
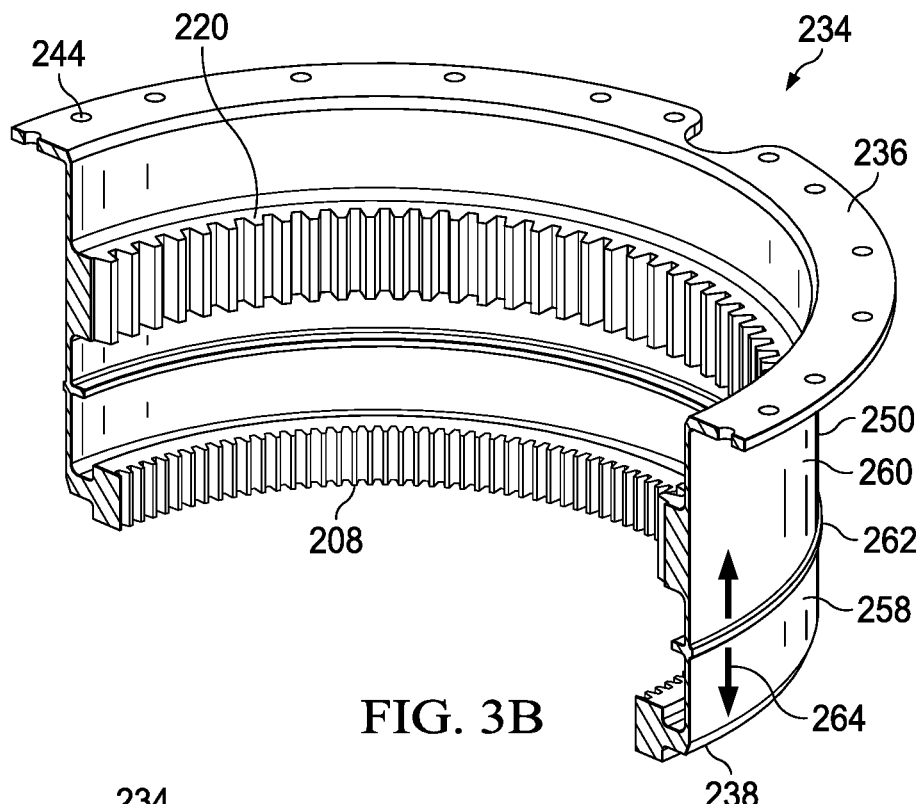
Figure 3C:
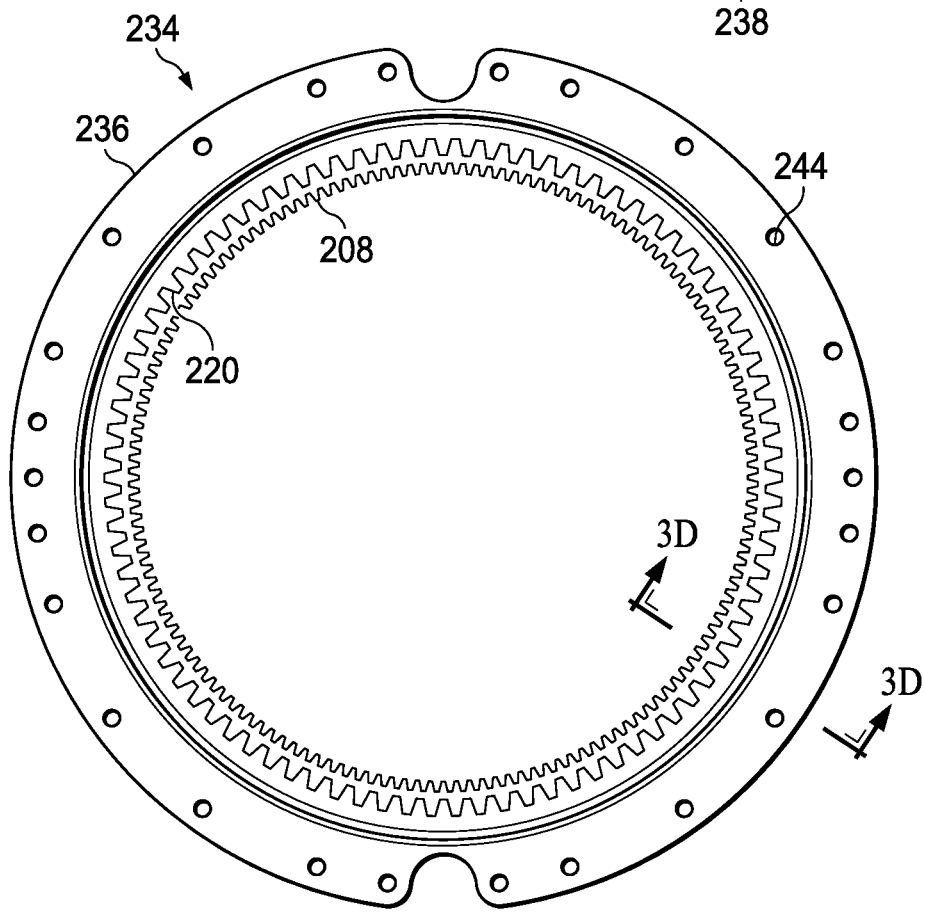
Figure 3D:
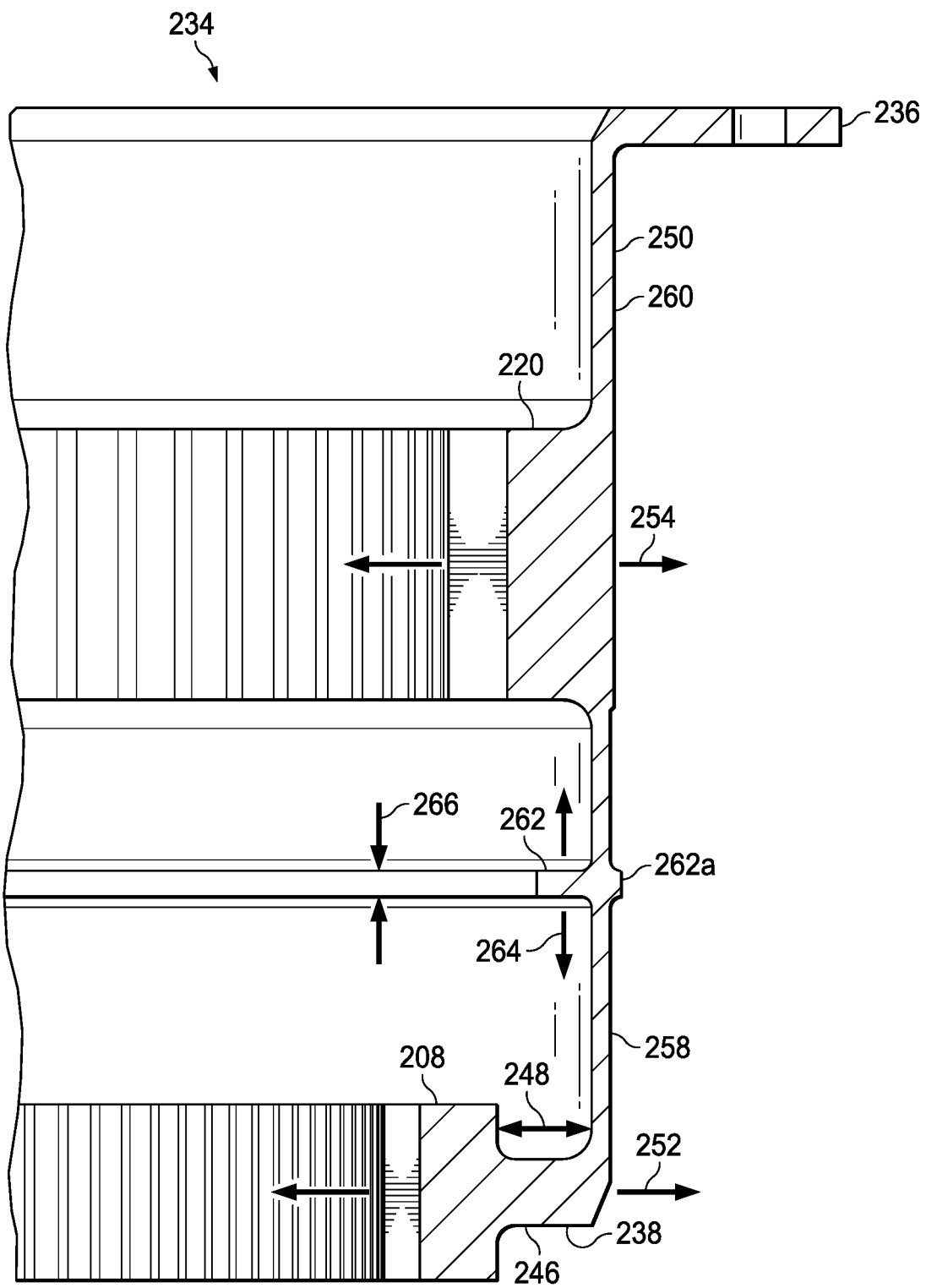

Referring to FIGS. 2A-2C in the drawings, housings used to support ring gears for multistage planetary gear systems in previous aircraft are illustrated. The internal gears of the multistage planetary gear systems including sun gears, planet gears and carriers have been omitted from FIGS. 2A-2C to more clearly show the housings and ring gears. In FIG. 2A, housing 100 supports two ring gears 102, 104 of a multistage planetary gear system. Both ends of housing 100 include a flange, namely bottom and top flanges 106, 108, which are used to mount housing 100 to adjacent structures. Housing 100 also includes flanges 110, 112 to secure ring gear 102 and flanges 114, 116 to secure ring gear 104. Ring gear 102 is sandwiched between flanges 110, 112 using bolts 118 and ring gear 104 is sandwiched between flanges 114, 116 using bolts 120. Housing 100 is assembled from several structurally separate parts including lower, middle and upper walls 122, 124, 126. Ring gears 102, 104 are structurally separate from one another and from walls 122, 124, 126 of housing 100, necessitating bolted or other types of joints to couple ring gears 102, 104 to housing 100. As planet gears impart radial loads on ring gears 102, 104, the joints between ring gears 102, 104 and flanges 110, 112, 114, 116 including bolts 118, 120 are subject to joint wear and failure, increasing maintenance requirements and reducing the reliability of the gearbox. The inclusion of six flanges 106, 108, 110, 112, 114, 116 as well as bolts 118, 120 increases the weight and volume of housing 100.

Similar to housing 100, housing 130 in FIG. 2B is supported by adjacent structures using two flanges 132, 134, one at each end. Housing 130 also requires multiple flanges 136 and bolts 138 to couple ring gears 140, 142 to lower, middle and upper walls 144, 146, 148 of housing 130. Gaps 150, 152 between ring gears 140, 142 and lower and middle walls 144, 146 relieve the joints including bolts 138 between ring gears 140, 142 and housing 130 of some of the radial load imparted by the planet gears. Maintaining gaps 150, 152, however, requires ring gears 140, 142 to be formed from additional material, which increases the weight of the gearbox. Gaps 150, 152 also occupy valuable space within housing 130. Because housing 130 includes multiple flanges 136 and joints including bolts 138, housing 130 suffers from similar drawbacks as housing 100 in FIG. 2A, namely increased weight, increased volume and the potential for joint failure. Also, neither housing 100 in FIG. 2A nor housing 130 in FIG. 2B is structurally monolithic or integral, instead relying on an assembly of different and structurally separate parts. In FIG. 2C, housing 158 supports ring gears 160, 162. Housing 158 includes two flanges, namely bottom and top flanges 164, 166, to anchor housing 158 against adjacent structures. Neither end of housing 158 is cantilevered and the inclusion of two flanges 164, 166 adds to the weight and volume of housing 158. Housing 158, which is intended for use in a main rotor gearbox of a helicopter, also lacks a means by which to individually tune the respective flexibilities of ring gears 160, 162.

Referring to FIGS. 3A-3D in the drawings, a gearbox including a multistage planetary gear system is schematically illustrated and generally designated 200. More particularly, multistage planetary gear system 200 is a two stage planetary gear system that may be utilized in any system of an aircraft such as in drivetrain 24 of tiltrotor aircraft 10 in FIGS. 1A-1C. For example, multistage planetary gear system 200 may be utilized in gearbox 42 to transmit torque originating from engine 28 to proprotor assembly 26*b* at a predetermined transmission ratio as shown in FIGS. 1A-1C. Multistage planetary gear system 200 receives rotational energy from driveshaft 202. Non-limiting examples of driveshaft 202 include interconnected driveshaft 40 or internal driveshaft 46 in FIGS. 1A-1C. Driveshaft 202 is coupled to high speed sun gear 204. High speed planet gears 206 are positioned between high speed sun gear 204 and high speed ring gear 208 and rotate about high speed sun gear 204 responsive to the rotation of high speed sun gear 204. High speed planet gears 206 mesh with both high speed sun gear 204 and high speed ring gear 208. High speed carrier 210 provides support to high speed planet gears 206 and rotates about centerline 212 with high speed planet gears 206. High speed carrier 210 is coupled to low speed sun gear 214 via splined connection 216 and provides rotational energy thereto. Low speed sun gear 214 transfers rotational energy to low speed planet gears 218, which rotate about low speed sun gear 214 and are interposed between low speed sun gear 214 and low speed ring gear 220. Low speed planet gears 218 mesh with both low speed sun gear 214 and low speed ring gear 220. Low speed planet gears 218 are supported by low speed carrier 222, which is coupled to output shaft 224 via splined connection 226. In one non-limiting example, output shaft 224 may be a mast such as mast 48 in FIGS. 1A-1C to provide rotational energy to a proprotor or rotor assembly. Sun gears 204, 214, ring gears 208, 220 and carriers 210, 222 are coaxial relative to centerline 212. In the illustrated embodiment, ring gears 208, 220 do not rotate about centerline 212.

The number of high speed planet gears 206 may differ from the number of low speed planet gears 218. For example, multistage planetary gear system 200 may include five high speed planet gears 206 and six low speed planet gears 218. Multistage planetary gear system 200 may include any number of high speed and low speed planet gears 206, 218. An increase in the number of planet gears 206, 218 may increase the load capacity and torsional rigidity of multistage planetary gear system 200. Additional planet gears also divide the load imparted by planet gears 206, 218 on adjacent gears, resulting in less deflection and gear teeth wear. While high speed sun gear 204 acts as the input and low speed carrier 222 acts as the output for multistage planetary gear system 200, any element of multistage planetary gear system 200 may act as either an input or output. For example, high speed carrier 210 may be coupled to driveshaft 202 and low speed sun gear 214 may be coupled to output shaft 224. It will be appreciated by one of ordinary skill in the art that the input and output for multistage planetary gear system 200 may be configured in a variety of ways to achieve a desired transmission ratio. Multistage planetary gear system 200 has two stages with first stage 228 including high speed sun gear 204, high speed planet gears 206, high speed ring gear 208 and high speed carrier 210 and second stage 230 including low speed sun gear 214, low speed planet gears 218, low speed ring gear 220 and low speed carrier 222. In other embodiments, multistage planetary gear system 200 may include three, four or more stages, with the number of stages depending on the desired transmission ratio. In other embodiments, first stage 228 may be a low speed stage and second stage 230 may be a high speed stage. Central conduit 232 may be used to pass equipment such as wires through the center of multistage planetary gear system 200.

Ring gears 208, 220 are supported by integral multistage ring gear system 234. Integral multistage ring gear system 234 including ring gears 208, 220 is monolithically formed from a substantially homogenous material such as steel, aluminum, titanium or composite material. Integral multistage ring gear system 234 thus jointlessly connects high speed ring gear 208 to low speed ring gear 220 to address the joint weakness and failure issues experienced by previous ring gears as discussed in FIGS. 2A-2C. Integral multistage ring gear system 234 may be manufactured using any additive, subtractive or formative manufacturing technique including, but not limited to, extrusion, machining, 3D printing, stamping, welding or casting as well as others. Integral multistage ring gear system 234 has a generally hollow cylindrical shape with a flanged end including flange 236 and a cantilevered end 238. Flange 236 projects away from centerline 212 of integral multistage ring gear system 234, although in other embodiments flange 236 may project inward. Flange 236 is the only flange formed by integral multistage ring gear system 234 and is the sole flange used to attach integral multistage ring gear system 234 to adjacent structures such as housing 240 and forward transmission support 242. Flange 236 includes holes 244 to facilitate such an attachment. By limiting the number of flanges on integral multistage ring gear system 234 to a single flange 236, the overall weight of multistage planetary gear system 200 is reduced and integral multistage ring gear system 234 is more easily packaged in space-restrictive aircraft systems such as transmissions. High speed ring gear 208 is formed at cantilevered end 238 and low speed ring gear 220 is formed between flange 236 and high speed ring gear 208. High speed ring gear 208 may have a different diameter than low speed ring gear 220. For example, in the illustrated embodiment high speed ring gear 208 has a smaller inner diameter than low speed ring gear 220. Integral multistage ring gear system 234 includes a spacer ring 246 surrounding high speed ring gear 208 at cantilevered end 238. Depth 248 of spacer ring 246 may vary to obtain a desired diameter of high speed ring gear 208. In other embodiments, low speed ring gear 220 may be surrounded by a spacer ring.

Ring gears 208, 220 are flexured ring gears that flex to accommodate cyclical radial loads from planet gears 206, 218. The flexibility of ring gears 208, 220 is provided by a flex wall 250 on which ring gears 208, 220 are formed. Flex wall 250 is configured to flex in response to radial loads imparted on ring gears 208, 220 by planet gears 206, 218 so that high speed ring gear 208 flexes radially in either direction along directional arrows 252 and low speed ring gear 220 flexes radially in either direction along directional arrows 254. Due to the lack of a flange on cantilevered end 238 of integral multistage ring gear system 234, high speed ring gear 208 experiences cantilevered motion to absorb, or comply with, radial loads from high speed planet gears 206. Housing 240, which is nonintegral and separate from integral multistage ring gear system 234, surrounds the outside of integral multistage ring gear system 234. A gap 256 is maintained between integral multistage ring gear system 234 and housing 240 to provide ring gears 208, 220 with the freedom to flex in directions 252, 254. Flex wall 250 includes a first stage flex wall 258 and a second stage flex wall 260. First and second stage flex walls 258, 260 may have different flexibilities, thereby providing ring gears 208, 220 with different flexibilities as well.

To facilitate tuning the respective flexibilities and stiffnesses of first and second stage flex walls 258, 260, first and second stage flex walls 258, 260 are divided by a tuning stiffener 262 interposed between ring gears 208, 220. Tuning stiffener 262 forms a ring shape around the circumference of integral multistage ring gear system 234. Tuning stiffener 262 projects both inward and outward from flex wall 250, with outward portion 262a of tuning stiffener 262 acting as a spacer to maintain gap 256 between integral multistage ring gear system 234 and housing 240. Tuning stiffener 262 decouples the flexibility of first stage flex wall 258 from second stage flex wall 260 to enable the independent flex of each ring gear 208, 220. Tuning stiffener 262 also prevents the load phases acting on ring gears 208, 220 from interfering with one another.

Tuning stiffener 262 may be located at any axial position between ring gears 208, 220 to determine or tune the respective flexibilities and stiffnesses of first and second stage flex walls 258, 260 and ring gears 208, 220. Depending on certain factors such as the anticipated radial loads on ring gears 208, 220, tuning stiffener 262 may be positioned anywhere along axial direction 264 to stiffen ring gears 208, 220 accordingly. For example, tuning stiffener 262 may be moved toward ring gear 220 to stiffen ring gear 220 and provide ring gear 208 with additional cantilevered flex. In the illustrated embodiment, tuning stiffener 262 is closer to low speed ring gear 220 than high speed ring gear 208. In other embodiments, tuning stiffener 262 may be located at a midpoint between ring gears 208, 220. In yet other embodiments, tuning stiffener 262 may be located closer to high speed ring gear 208 than low speed ring gear 220. Thickness 266 of tuning stiffener 262 may also be increased or decreased to adjust the degree of stiffness imparted by tuning stiffener 262. For example, tuning stiffener 262 may have sufficient thickness 266 to decouple the flex of ring gears 208, 220. Using tuning stiffener 262 to adjust the stiffnesses of ring gears 208, 220 allows flex wall 250 to be thinner since stiffening functionality is derived from tuning stiffener 262 instead of flex wall 250. In other embodiments, however, the thickness of flex wall 250 may be varied to tune the flexibility of each ring gear 208, 220. Lead variation may also be balanced by adjusting axial position 264 of tuning stiffener 262 and the location of flange 236.

Figure 4A:
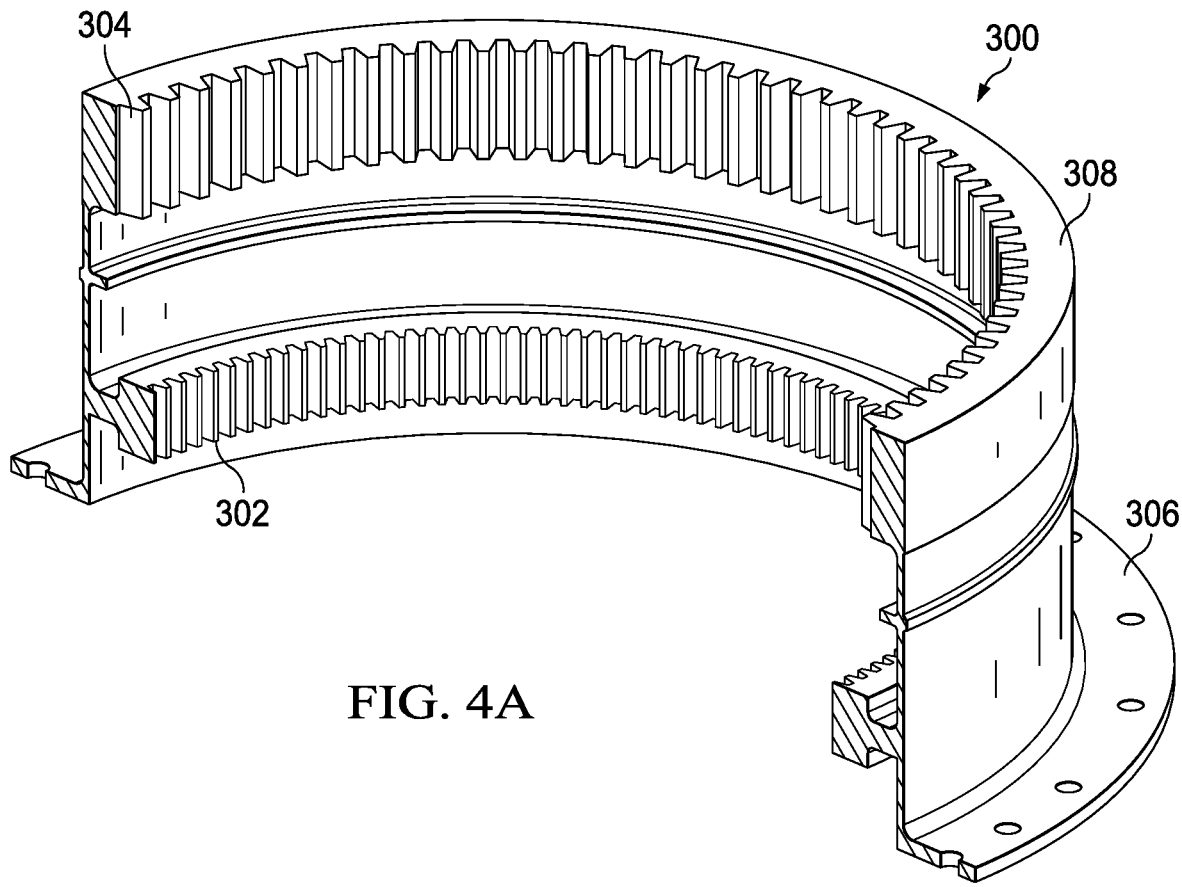
FIGS. 4A-4C are isometric cross-sectional views of various integral multistage ring gear systems having different configurations in accordance with embodiments of the present disclosure.
Figure 4B:
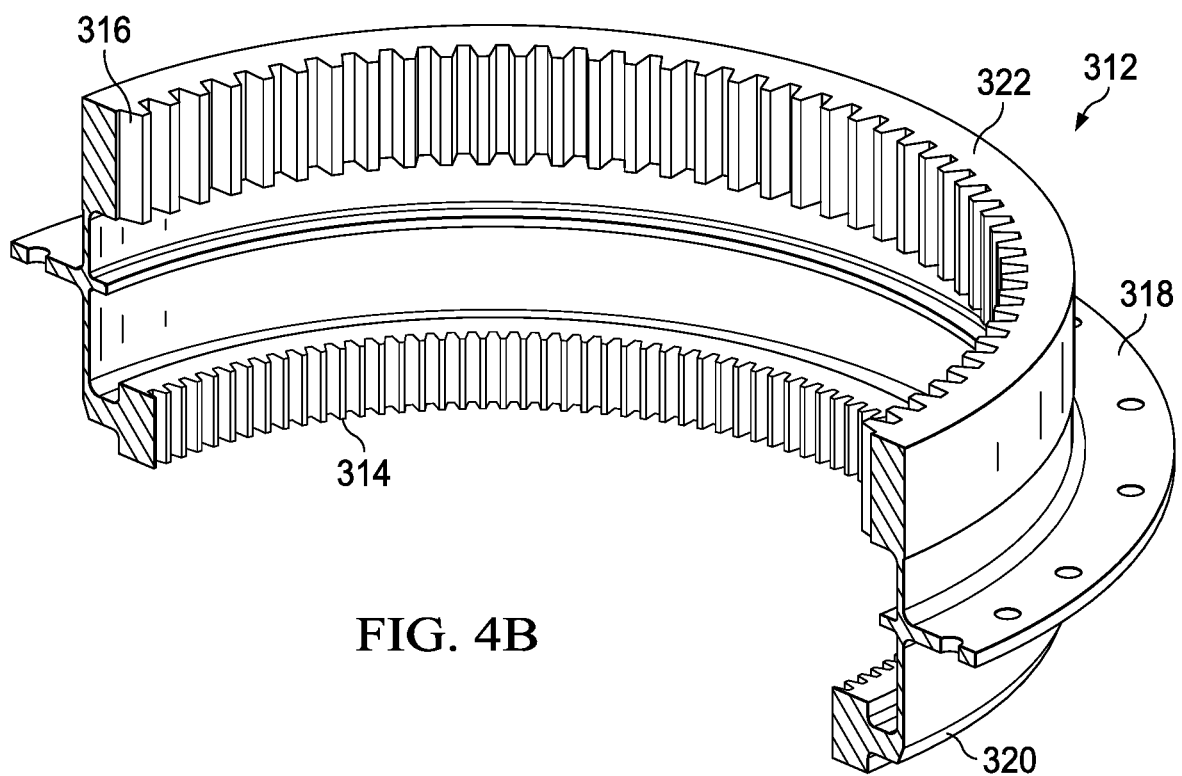
Figure 4C:
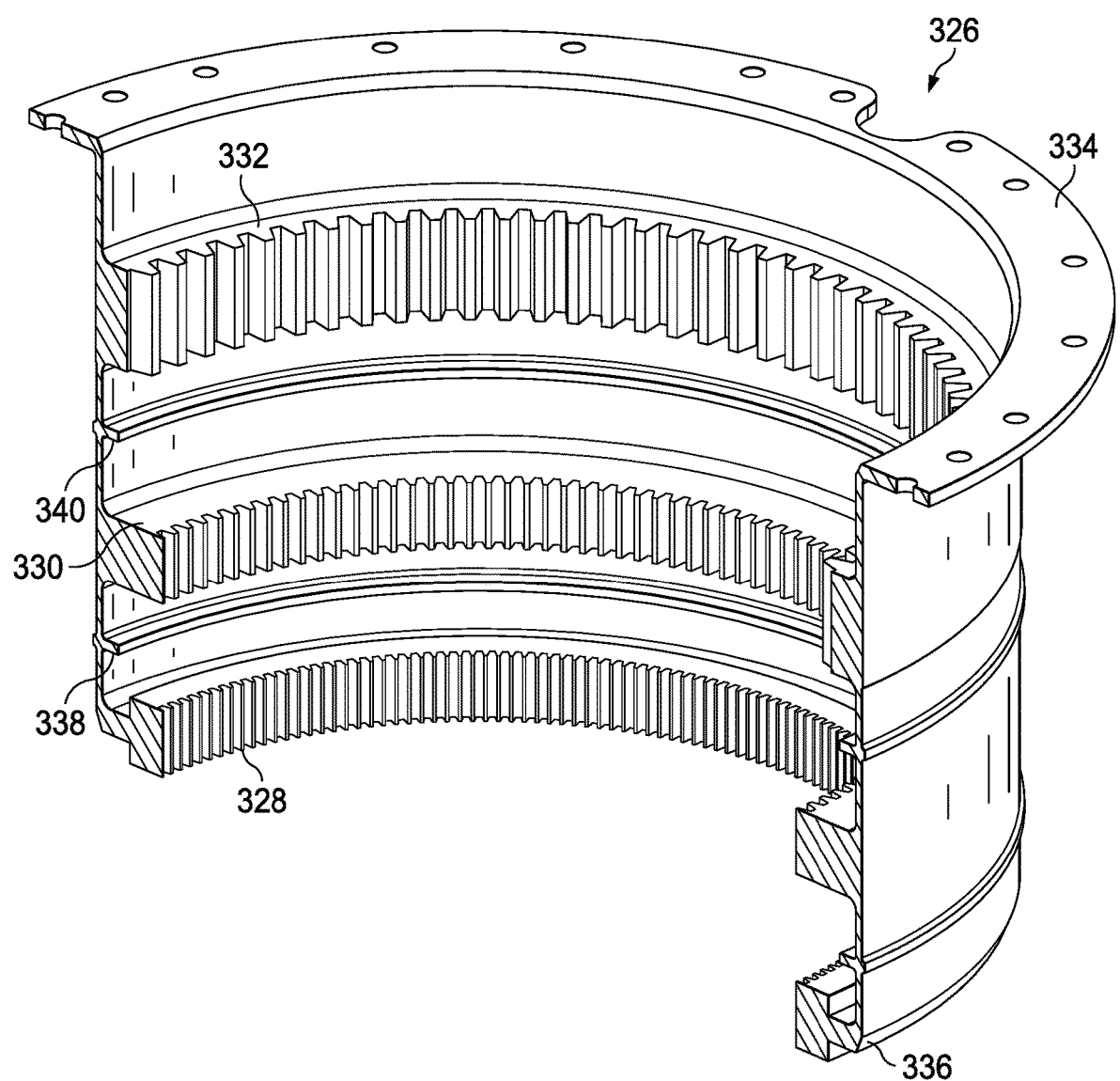

Referring to FIGS. 4A-4C in the drawings, various integral multistage ring gear systems having different configurations are schematically illustrated. In FIG. 4A, integral multistage ring gear system 300 forms high speed ring gear 302 and low speed ring gear 304. Integral multistage ring gear system 300 retains a single flange 306 that is positioned on the bottom end of integral multistage ring gear system 300 adjacent to high speed ring gear 302. Cantilevered end 308 forms low speed ring gear 304. High speed ring gear 302 may absorb a different radial load than low speed ring gear 304. Flange 306 may be positioned adjacent to the ring gear that is impacted by higher radial loads from planet gears, thus providing additional support where needed. In FIG. 4B, integral multistage ring gear system 312 forms high speed ring gear 314 and low speed ring gear 316. Integral multistage ring gear system 312 includes a single flange 318 that is interposed between ring gears 314, 316. Thus, both ends of integral multistage ring gear system 312 are cantilevered ends 320, 322. Flange 318 may also act as a tuning stiffener to provide different flexibilities to ring gears 314, 316. Flange 318 may be located at any axial position between ring gears 314, 316 depending on the desired flexibility of each ring gear. For example, flange 318 may be positioned closer to low speed ring gear 316 if it is desired that low speed ring gear 316 be stiffer than high speed ring gear 314.

In FIG. 4C, integral multistage ring gear system 326 forms high speed ring gear 328, middle speed ring gear 330 and low speed ring gear 332. Integral multistage ring gear system 326 demonstrates that the integral multistage ring gear systems of the illustrative embodiments may be used in multistage planetary gear systems having any number of stages. Integral multistage ring gear system 326 is used in a three stage planetary gear system. Integral multistage ring gear system 326 has a single flange 334 adjacent to low speed ring gear 332 and a cantilevered end 336 adjacent to high speed ring gear 328. Integral multistage ring gear system 326 includes two tuning stiffeners 338, 340. Tuning stiffener 338 is interposed between high speed ring gear 328 and middle speed ring gear 330. Tuning stiffener 340 is interposed between middle speed ring gear 330 and low speed ring gear 332. Tuning stiffeners 338, 340 may be positioned anywhere along the axial direction to tune the stiffnesses of ring gears 328, 330, 332.

Figure 5A:
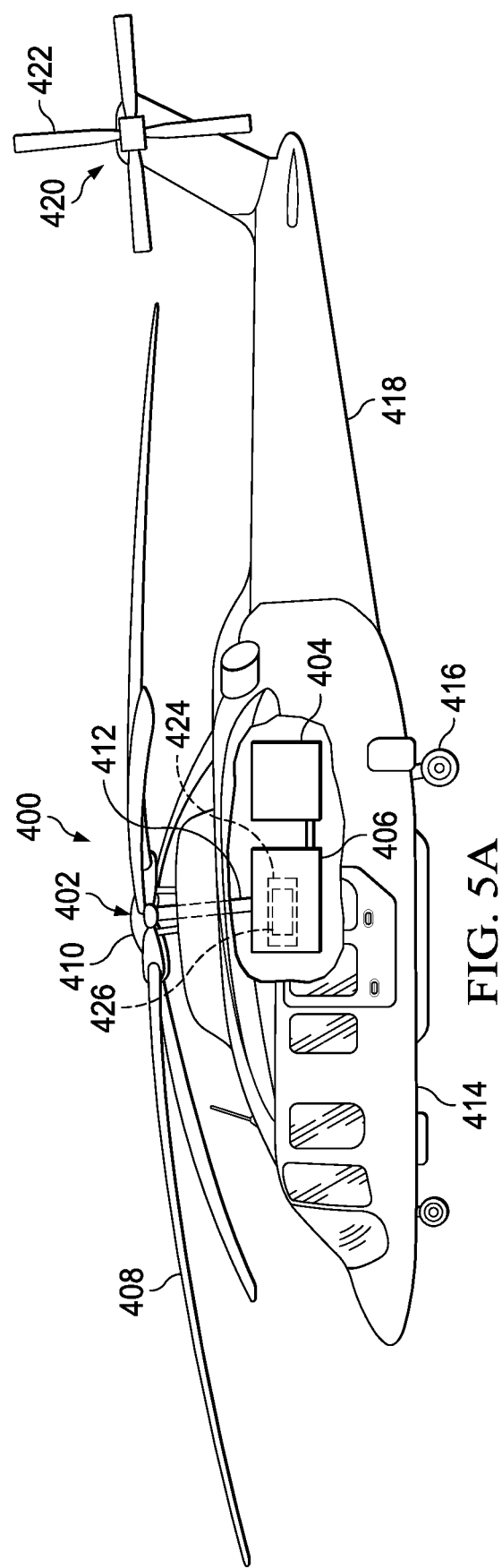
FIGS. 5A-5B are schematic illustrations of a helicopter utilizing an integral multistage ring gear system in accordance with embodiments of the present disclosure.
Figure 5B:
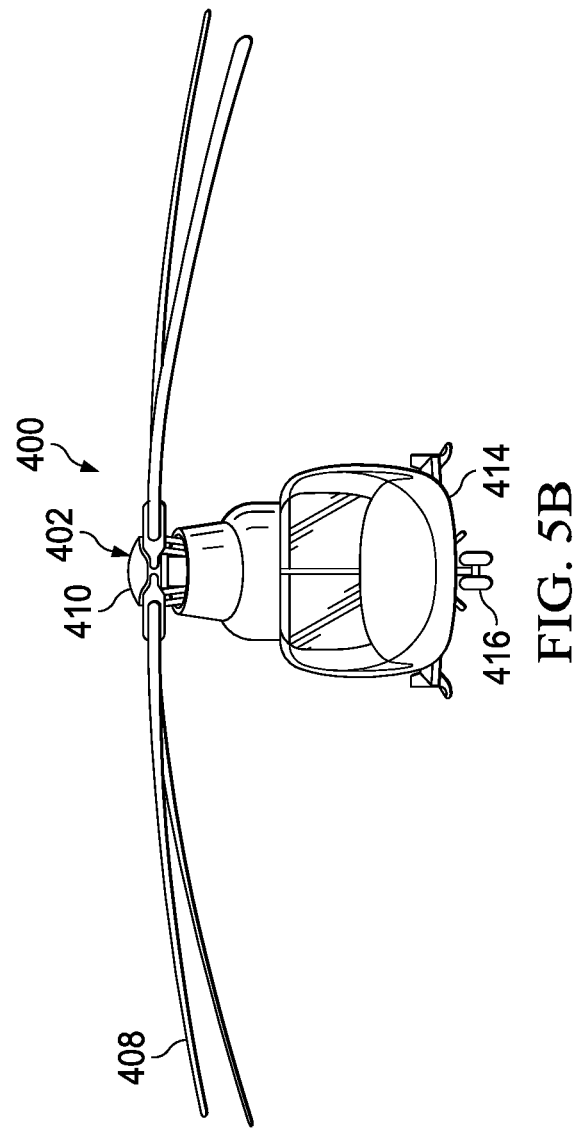

Referring to FIGS. 5A-5B in the drawings, a helicopter is schematically illustrated and generally designated 400. The primary propulsion assembly of helicopter 400 is a main rotor assembly 402 powered by an engine 404 via a main rotor gearbox 406. Main rotor assembly 402 includes a plurality of rotor blade assemblies 408 extending radially outward from a main rotor hub 410. Mast 412 provides rotational energy from main rotor gearbox 406 to main rotor hub 410. Main rotor assembly 402 is coupled to fuselage 414. Main rotor hub 410 is rotatable relative to fuselage 414. The pitch of rotor blade assemblies 408 can be collectively and/or cyclically manipulated to selectively control direction, thrust and lift of helicopter 400. A landing gear system 416 provides ground support for helicopter 400. A tailboom 418 extends from fuselage 414 in the aft direction. An anti-torque system 420 includes a tail rotor 422 that is rotatably coupled to the aft portion of tailboom 418. Anti-torque system 420 controls the yaw of helicopter 400. Main rotor gearbox 406 includes multistage planetary gear system 424, which utilizes integral multistage ring gear system 426. Integral multistage ring gear system 426 may have any configuration such as those described in the illustrative embodiments. The inclusion of integral multistage ring gear system 426 on helicopter 400 is demonstrative of the numerous aircraft types and applications on which the integral multistage ring gear systems of the illustrative embodiments may be implemented.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drivetrain for an aircraft comprising:
an engine;
a driveshaft configured to receive rotational energy from the engine; and
a gearbox including a multistage planetary gear system configured to receive rotational energy from the driveshaft, the multistage planetary gear system comprising:
an integral multistage ring gear system having a flanged end and a cantilevered end, the integral multistage ring gear system forming a first stage ring gear at the cantilevered end and a second stage ring gear interposed between the flanged end and the first stage ring gear, the integral multistage ring gear system forming a flex wall including a first stage flex wall and a second stage flex wall divided by a tuning stiffener having an axial position along the integral multistage ring gear system, the axial position of the tuning stiffener determining the respective flexibilities of the first and second stage flex walls;
a first stage sun gear, a plurality of first stage planet gears rotatable about the first stage sun gear and a first stage carrier coupled to the plurality of first stage planet gears, the plurality of first stage planet gears mating with the first stage ring gear; and
a second stage sun gear, a plurality of second stage planet gears rotatable about the second stage sun gear and a second stage carrier coupled to the plurality of second stage planet gears, the plurality of second stage planet gears mating with the second stage ring gear.

2. The drivetrain as recited in claim 1 wherein the integral multistage ring gear system is monolithically formed from a substantially homogenous material.

3. The drivetrain as recited in claim 1 wherein the integral multistage ring gear system jointlessly connects the first stage ring gear to the second stage ring gear.

4. The drivetrain as recited in claim 1 wherein the integral multistage ring gear system further comprises a spacer ring surrounding the first stage ring gear at the cantilevered end of the integral multistage ring gear system.

5. The drivetrain as recited in claim 1 wherein a sole flange of the integral multistage ring gear system projects radially outwardly from the flanged end of the integral multistage ring gear system.

6. The drivetrain as recited in claim 1 wherein the first stage flex wall has a different flexibility than the second stage flex wall.

7. The drivetrain as recited in claim 1 wherein the tuning stiffener forms a ring.

8. The drivetrain as recited in claim 1 wherein the tuning stiffener projects radially inwardly from the flex wall.

9. The drivetrain as recited in claim 1 wherein the tuning stiffener is configured to decouple the flexibility of the first stage flex wall from the second stage flex wall.

10. The drivetrain as recited in claim 1 wherein the first and second stage ring gears are flexured ring gears to accommodate radial loads from the plurality of first and second stage planet gears.

11. The drivetrain as recited in claim 1 wherein the first stage sun gear is coupled to the driveshaft, the second stage sun gear is coupled to the first stage carrier and the second stage carrier is coupled to an output shaft.

12. The drivetrain as recited in claim 1 wherein the first stage ring gear further comprises a high speed ring gear and the second stage ring gear further comprises a low speed ring gear.

13. The drivetrain as recited in claim 12 wherein the high speed ring gear has a smaller inner diameter than the low speed ring gear.

14. The drivetrain as recited in claim 1 wherein the first stage ring gear experiences cantilevered motion to absorb radial loads from the plurality of first stage planet gears.

15. The drivetrain as recited in claim 1 further comprising a rotor assembly including a plurality of rotor blades and a mast, the second stage carrier coupled to the mast.

16. A tiltrotor aircraft comprising:
a fuselage;
an engine disposed within the fuselage;
a wing supported by the fuselage; and
first and second pylon assemblies rotatably coupled to outboard ends of the wing, each pylon assembly comprising:
an internal driveshaft;
a proprotor assembly including a plurality of proprotor blades and a mast; and
a gearbox including a multistage planetary gear system configured to receive rotational energy from the internal driveshaft, the multistage planetary gear system comprising:
an integral multistage ring gear system having a flanged end and a cantilevered end, the integral multistage ring gear system forming a first stage ring gear at the cantilevered end and a second stage ring gear interposed between the flanged end and the first stage ring gear;
a first stage sun gear, a plurality of first stage planet gears rotatable about the first stage sun gear and a first stage carrier coupled to the plurality of first stage planet gears, the plurality of first stage planet gears mating with the first stage ring gear; and
a second stage sun gear, a plurality of second stage planet gears rotatable about the second stage sun gear and a second stage carrier coupled to the plurality of second stage planet gears, the plurality of second stage planet gears mating with the second stage ring gear, the second stage carrier coupled to the mast;
wherein, the wing includes an interconnected driveshaft configured to transfer rotational energy from the engine to the pylon assemblies, the internal driveshafts transferring rotational energy from the interconnected driveshaft to the multistage planetary gear systems.

17. The tiltrotor aircraft as recited in claim 16 wherein the pylon assemblies each further comprise a spiral bevel gearbox interposed between the interconnected driveshaft and the multistage planetary gear system.

18. A drivetrain for an aircraft comprising:
an engine;
a driveshaft configured to receive rotational energy from the engine; and
a gearbox including a multistage planetary gear system configured to receive rotational energy from the driveshaft, the multistage planetary gear system comprising:
an integral multistage ring gear system having a flanged end and a cantilevered end, the integral multistage ring gear system forming a first stage ring gear at the cantilevered end and a second stage ring gear interposed between the flanged end and the first stage ring gear;

a first stage sun gear, a plurality of first stage planet gears rotatable about the first stage sun gear and a first stage carrier coupled to the plurality of first stage planet gears, the plurality of first stage planet gears mating with the first stage ring gear; and a second stage sun gear, a plurality of second stage planet gears rotatable about the second stage sun gear and a second stage carrier coupled to the plurality of second stage planet gears, the plurality of second stage planet gears mating with the second stage ring gear;

wherein, the first stage ring gear is a high speed ring gear and the second stage ring gear is a low speed ring gear; and wherein, the high speed ring gear has a smaller inner diameter than the low speed ring gear.

19. The drivetrain as recited in claim 18 wherein the integral multistage ring gear system further comprises a spacer ring surrounding the high speed ring gear at the cantilevered end of the integral multistage ring gear system.

20. The drivetrain as recited in claim 18 wherein the high speed and low speed ring gears are flexured ring gears to accommodate radial loads from the plurality of first and second stage planet gears.

\* \* \* \* \*